US005211014A

United States Patent [19]

Kropp

[11] Patent Number: 5,211,014

[45] Date of Patent: May 18, 1993

[54] HYDRAULIC DRIVE SYSTEM

[75] Inventor: Walter Kropp, Sulzbach

[73] Assignee: Linde Aktiengesellschaft, Wiesbaden, Fed. Rep. of Germany

[21] Appl. No.: 817,452

[22] Filed: Jan. 6, 1992

[30] Foreign Application Priority Data

Jan. 15, 1991 [DE] Fed. Rep. of Germany ....... 4100988

[51] Int. Cl.[5] ............................................ F16H 39/48

[52] U.S. Cl. ........................................ 60/421; 91/532; 91/459

[58] Field of Search ................. 91/532, 459, 526, 528, 91/529; 60/421, 428, 429, 430, 433, 459

[56] References Cited

U.S. PATENT DOCUMENTS

| | | | |
|---|---|---|---|
| 3,720,059 | 3/1973 | Schurawski et al. | 60/421 |
| 4,461,148 | 7/1984 | Krusche . | |
| 4,570,441 | 2/1986 | Yoshida et al. | 60/421 |
| 4,768,339 | 9/1988 | Aoyagi et al. | 60/428 X |
| 5,052,179 | 10/1991 | Fuji | 60/421 |
| 5,063,739 | 11/1991 | Bianchetta et al. | 60/421 |

FOREIGN PATENT DOCUMENTS 3146508 6/1982 Fed. Rep. of Germany .

*Primary Examiner*—Edward K. Look
*Assistant Examiner*—Hoang Nguyen
*Attorney, Agent, or Firm*—Thomas R. Shaffer

[57] ABSTRACT

A hydraulic drive system consists of a first partial system I and a second partial system II. Each partial system has a pump regulated by the stream required (1,9) and a hydraulic energy consumer connected to its output line (2,10). Load pressure lines (7,13) that sense the maximum load pressure are also provided in each partial system I and II; they are connected with the required flow regulators (8,14) of the pumps (1,9). A coupling device III is provided for connecting the feed lines (2,10) and the load pressure lines (7,13) of the two partial systems I and II. The coupling device III can be switched as a function of a consumer designed for driving and is connected with a circuit logic IV that supervises the driving of this consumer. The circuit logic consists of a NAND (not-and-) element (19) and an UND (and-) element (22).

5 Claims, 3 Drawing Sheets

HYDRAULIC DRIVE SYSTEM

BACKGROUND OF THE INVENTION

1. Field of the Invention

The invention concerns a hydraulic drive system with an initial partial system and a second partial system, where the partial system encompass a pump regulated by the stream required and hydraulic energy consumers connected to its output line, as well as a load pressure line carrying the maximum load pressure, and where a coupling device is provided for connecting the output line and the load pressure line of the first partial system with the output line and the load pressure line of the second partial system.

2. Description of the Art

Such a drive system is described in the DE-OS 31 46 508. The two partial systems are automatically coupled to a single-circuit system as soon as the useful stream of pressure medium in the one partial system is greater than the maximum useful stream available of the pump of this partial system. The coupling and separation occur exclusively as a function of the pressure gradient at the multiway valve assigned to the consumer actuated and controlling its direction and speed of movement. It makes no difference here which consumer is actuated. This can, however, be disadvantageous in some cases, e.g. if in the hydraulic drive system of an excavator the first partial system that handles the consumer required for raising and lowering the excavator column and the second partial system is provided for the filling and emptying movement of the excavator shovel. When the column is raised and shovel is emptied, the consumer assigned to the shovel will have only a slight load pressure, but a high rate of movement. On the other hand, the load pressure of the consumer assigned to the column is considerably higher and the rate of movement is considerably less. Thus, a specific consumer driven by the first partial system may have operating requirements which are different than the operating requirements of a consumer driven by the second partial system. If both partial systems are coupled, a high pressure level will prevail in the feed lines as a whole and correspondingly the total feed quantity determined by this high pressure level will be less at a constant hydraulic power output than when the pumps are operated individually. The proportion of transition power to the hydraulic power output, i.e., of the proportion of power manifested as fluid volume stream, is thus smaller after coupling; on the other hand, the power proportion that is manifested as pressure is greater. However, the oil leakage and pressure losses are thus also higher.

The present invention proposes to offer a hydraulic drive system of the above type, with which a higher transition or turnover power is attainable.

SUMMARY OF THE INVENTION

This problem is solved according to the invention in that the coupling device is in working connection with a a control means including circuit logic that supervises the drive of the consumer. The essential concept of the invention accordingly consists in the use of a control means for limiting the coupling of the two partial systems into a single-circuit system to cases in which this is meaningful, namely to cases in which a high total feed stream is required, which depends on the type and operating requirements of the consumer to be actuated Thus, the travel drive of a hydraulically driven excavator usually has a high feed stream requirement. Expediently, the two partial systems will be coupled in driving the consumers pertaining to the travel drive.

To determine which consumers are driven, it is proposed according to an advantageous further refinement of the invention for the coupling device to be in working connection with a circuit logic supervising the drive of the consumers.

It is also favorable if the partial systems are mutually connected through the coupling device when the consumers are not actuated and the circuit logic has a not-and-element, whose first input is connected with a signal transmitter of at least one consumer whose power supply is provided by the coupled partial systems, whose second input is connected with the output of an and-element, to the inputs of which signal transmitters of the consumers of both partial systems are connected and whose hydraulic power supply, with simultaneous actuation, is provided through the proper partial system, in which case a signal transmitter of at least one consumer of the first partial system is connected to the one input of the and-element and a signal transmitter of at least one consumer of the second partial system is connected to the other input.

A circuit logic constructed in this manner requires few individual components. The signal transmitters act on the and-element and the not-and-element of the circuit logic only when the consumers are driven. In the outflow position, i.e., when the consumers are not driven, thus if a signal from a signal transmitter is not present at either the and-element or not-and-element, there is no signal at the output of the circuit logic and the partial systems are then coupled to a single-circuit system. Of course, the circuit logic can also be realized with the opposite signs, such that the signals are present at the components of the circuit logic when the consumers are not driven and there is also a signal at the output of the circuit logic and the partial systems are coupled.

To hold down the switching costs for the separation and coupling of the partial systems, according to an expedient refinement of the coupling unit, the latter consists of a multiway valve installed between the feed lines and the load pressure lines of the partial systems and has an open and a closed position, and which is spring-loaded in the opening direction and can be acted upon by an output signal of the circuit logic carried in a signal line in the closing position.

The output signal advantageously consists of a hydraulic pressure signal and the circuit logic is then formed of hydraulic valves, a first multiway valve of which is connected to the signal line and spring-loaded in the outflow state it connects the signal line with the output of a second multiway valve installed in front of it and in the actuated state it connects the signal line to a drain line, in which case the second multiway valve, spring-loaded in the outflow state, connects the signal line to a drain line and in the actuated state it connects the signal line with a line in which a pressure is present as a function of the driving of at least one of the consumers pertaining to one of the partial systems.

Because in many cases the multiway valves installed in front of the consumers are driven by means of a control pressure that is produced by a consumer actuation element, it proved advantageous to manipulate the valves of the circuit logic hydraulically also. In this manner, the consumer actuation element constitutes a signal transmitter for driving the circuit logic.

According to another embodiment of the invention that achieves additional advantages, it is proposed that the coupling unit consist of a first multiway valve located between the feed lines of the partial systems and a second multiway valve located between the load pressure lines of the partial systems, where the multiway valves that have an open and a closed position and throttling in the intermediate positions can be acted on in the closing direction by a hydraulic pressure signal in parallel and where the working range of the second multiway valve is above the working range of the first multiway valve. A signal size-dependent coupling and separation of the two partial systems is achieved by the multiway valves throttling in intermediate positions; they can be controlled by the attendant by manipulating the consumer actuation elements. Speed changes in the consumers actuated can be managed in this manner with the sudden transition from a single-circuit to the two-circuit system and vice versa.

Additional advantages and details of the invention are described in greater detail with reference to the implementation example shown schematically in the following figures.

DETAILED DESCRIPTION OF THE PREFERRED EMBODIMENT

Figure 1:
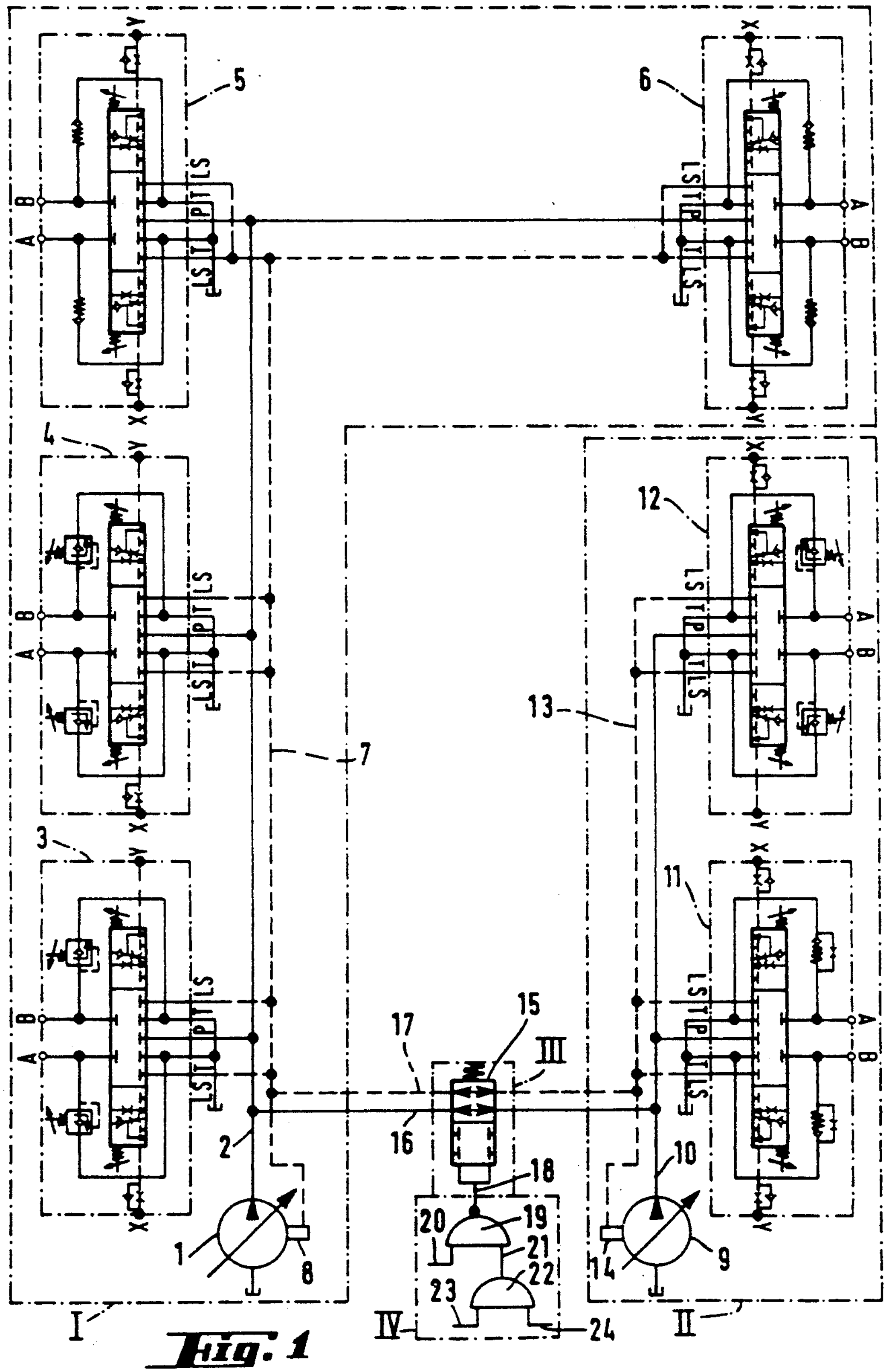
FIG. 1 shows the basic construction of a circuit diagram for a hydraulic drive system according to the invention, using logical operators for depicting the circuit logic.

A hydraulic drive system, which is provided in this example for a hydraulic excavator, consists of two partial systems I and II. The first partial system I has an adjusting pump 1 regulated by the stream required, to the feed line 2 of which several multiway valves 3, 4, 5 and 6 throttling in intermediate positions are connected, with the aid of which various hydraulic power consumers (not shown) can be actuated. The multiway valves 3, 4, 5 and 6 are controlled hydraulically by suitable signal transmitters (connections x and y). The highest load pressure of all consumers of the first partial system I is communicated through a common load-sensing line 7 to a required-stream regulator 8 of the adjusting pump 1 and its feed volumes are set according to the specifications arbitrarily established at the multiway valves for the rates of movement of the consumers.

The second partial system II also has a required stream-regulated adjusting pump 9, to the feed line 10 of which several multiway valves 11 and 12 throttling in intermediate positions are connected and with the aid of which additional hydraulic power consumers (not shown) can be actuated. The multiway valves 11 and 12 are controlled hydraulically by signal transmitters (connections x and y). The highest load pressure of the two consumers of partial system II is communicated through a common load-sensing line 13 to a required stream-regulator 14 of the adjusting pump 9 and the feed volumes of which are set according to the specifications arbitrarily established at the multiway valves 11 and 12 for the rates of movement of the consumers.

A coupling device III designed as a multiway valve 15 is provided for connecting the two partial systems I and II; it is switched into a line 16 connecting the two feed lines 2 and 10 and, in parallel with this, into a line connecting the two load-sensing lines 7 and 13. The multiway valve 15 is spring-loaded in the opening direction, in which the feed lines 2 and 10 and the load-sensing lines 7 and 13 are connected to each other, so that the two partial systems I and II are mutually connected in the outflow state. In the closure direction, the multiway valve 15 can be acted upon by an output signal of a circuit logic IV carried in a signal line 18.

The circuit logic IV consists of a not-and-element 19, whose output is connected to the signal line 18. A first input 20 of the not-and-element 19 is connected in a manner not shown in the Figure with the signal transmitters of consumers, whose power supply is to take place through the mutually connected partial systems I and II. A second input 21 is connected to the output of an and-element 22, which has two inputs 23 and 24. A signal transmitter of a consumer of the partial system I is connected to the input 23 (the signal transmitters of several consumers of the partial system I can also be connected) and a signal transmitter of a consumer of the partial system II is connected to the input 24 (several signal transmitters of several consumers of partial system II can also be connected here). The consumers whose signal transmitters are connected to the inputs of the and-element 22 are to be supplied from their own partial system.

The circuit logic functions as follows: The partial systems I and II are in the outflow position, i.e., coupled in the case of unactuated consumers, where the two adjusting pumps 1 and 9 put out the smallest possible feed volumes. If a consumer of the partial system I, e.g., the consumer provided for turning the upper carriage of the excavator, is driven through a signal transmitter whose signal is present at the input 23 of the and-element 22, the supplying of the consumer driven is taken over by both partial systems I and II, while there is no signal at either the second input 24 of the and-element or at the first input 20 of the not-and-element 19 and thus there is no signal at the output of the and-element 22 (or at the second input 21 of the not-and-element 19) nor at the output of the not-and-element 19.

Now if a consumer of the partial system II is switched on, e.g., a consumer for raising and lowering the excavator column, there is a signal at the second input 24 of the and-element. Because signals are thus present at both inputs, at the output a signal is sent to the second input 21 of the not-and-element 19. An output signal is thus also passed on by the not-and-element 19, while no signal is present at the first input 20. The signal thus present in the signal line 18 effects a switching of the multiway valve 15 in the closing direction and thus a separation of the two partial systems I and II. The feed streams of the adjusting pumps 1 and 9 are thus set individually, each according to the highest load pressure that is present in the load-sensing lines 7 and 13.

Now if a signal is also present at the second input 20 of the not-and-element 19, because a consumer of the partial system I is driven, e.g., the travel drive, to the supplying of which the partial system II is also to contribute, no signal will any longer be emitted at the output of the not-and-element 19. The multiway valve 15 thus again switches into the opening direction and connects the feed lines 2 and 10 and the load-sensing lines 7 and 13.

Figure 2:
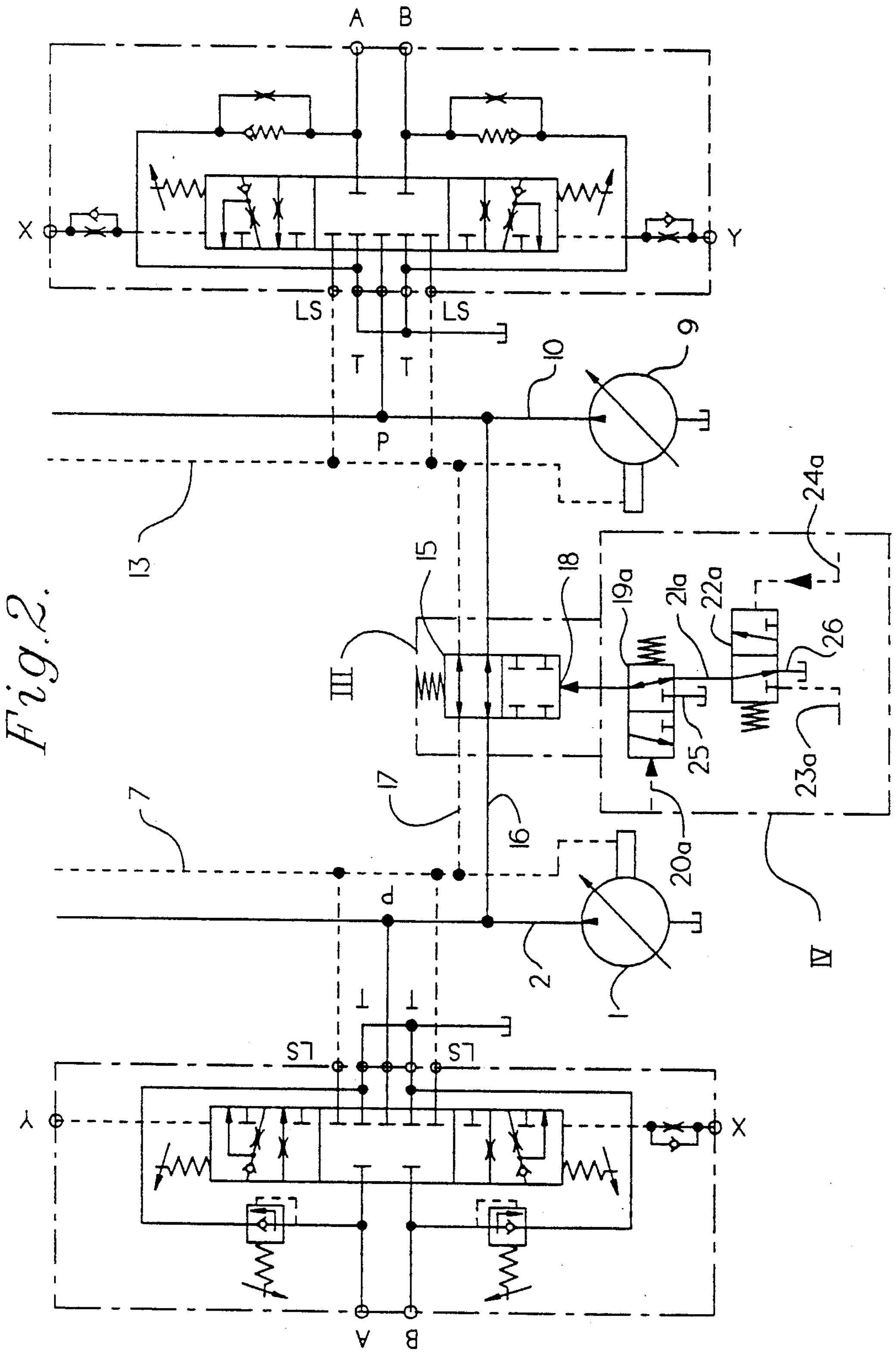
FIG. 2 shows a section of the circuit diagram according to FIG. 1, in which the circuit logic is comprised of hydraulic valves.

The actualization of the circuit logic IV by means of hydraulic components is shown in FIG. 2. The not-and-element 19 is formed by a spring-loaded multiway valve 19*a*, which is switched into the signal line 18. The multiway valve 19*a* can be acted upon against the spring force by a pressure carried in a line 20*a*, which can be obtained, e.g., from the control pressure lines x and y of one of the consumers whose supplying is to take place through both partial systems I and II.

When the multiway valve 19*a* is acted upon fully, it connects the signal line 18 with a drain line 25. In this position, the multiway valve 15, which forms the coupling unit, is thus relieved and connects the two partial systems I and II.

The and-element 22 consists of a spring-loaded multiway valve 22*a*, which in the starting position connects the signal line 18 via a line 21*a* with a drain line 26. The multiway valve 22*a* can be acted upon by the pressure in a line 24*a* against the spring force and then connects the line 21*a* and the signal line 18 with a line 23*a*. So long as a pressure is present in this line 23*a* and the multiway valve 19*a* is not acted upon, a pressure signal is present in the signal line 18, which effects a separation of the two partial systems I and II.

Figure 3:
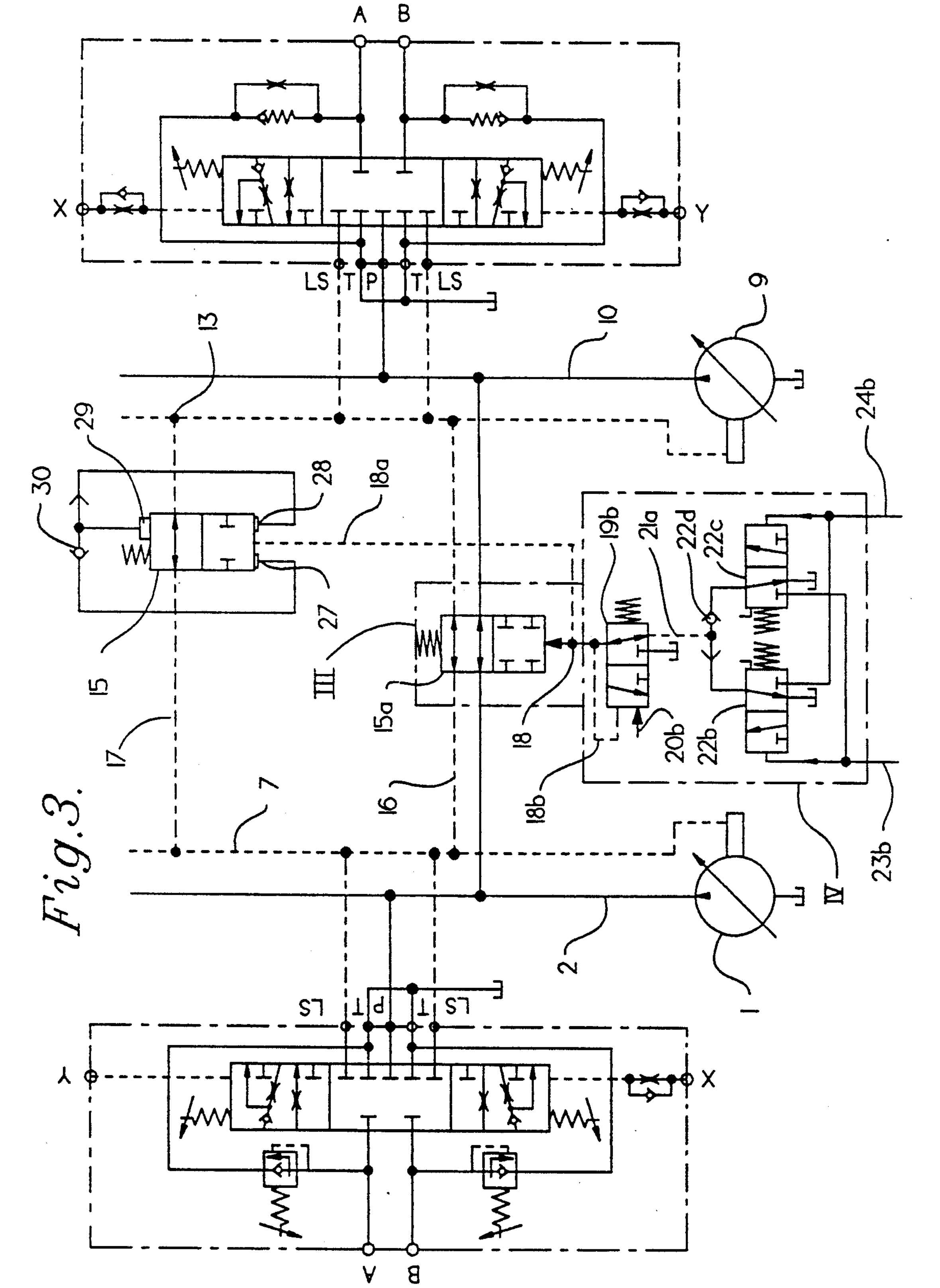
FIG. 3 shows a variant of the circuit logic and the coupling unit.

A coupling device III is shown in FIG. 3; it permits a signal-size-dependent coupling of the two partial systems I and II. The coupling device III consists of two multiway valves 15*a* and 15*b* that throttle in intermediate positions. The multiway valve 15*a* spring-loaded in the opening direction is switched into the line 16, which connects the feed lines 2 an 10 of the partial systems I and II and can be acted upon in the closing direction hydraulically by a pressure carried in the signal line 18.

The multiway valve 15*b* is switched into the line 17 connecting the load-sensing lines 7 and 13 and can be acted upon hydraulically in the closing position by a pressure in the signal line 18, which is passed on via a branch line 18*a* to the multiway valve 15*b*.

Two control surfaces 27 and 28 acting in the closing direction are provided at the multiway valve 15 *b*, and a control surface 29 acting in the opening direction. The control surface 27 is connected to the load-sensing line 7 of partial system I with the line 17. The control surface 28 is connected to the load-sensing line 13 of partial system II with the line 17. The control surface 29, which is as large as the control surfaces 27 and 28 together, is connected to both partial systems via intermediate switching of a changeover valve 30 with the line 17 and is thus acted upon with the highest of the load pressures of partial system I or partial system II. An additional spring, acting in the opening direction, handles a definite switching position when the drive system is placed in operation.

The structure of the circuit logic IV is slightly modified in comparison with the construction in FIG. 2. The pressure in the signal line 18 is returned via a line 18*b* to the multiway valve 19*b*, which carries the not-and-element. The and-element consists of two multiway valves 22*b* and 22*c* and a changeover valve 22*d*, which are switched so that the lower one of the pressures present at the inputs 23*b* and 24*b* is passed on to the line 21*a* (provided pressure is present at both inputs). The input pressures are advantageously taken from the signal transmitters producing the control pressure. There are thus variable input pressures so that the output pressure signal of the circuit logic is also variable and thus can be influenced with the control levers of the consumer actuation elements.

The working ranges of the two multiway valves 15*a* and 15*b*, i.e., the ranges in which a switching is effected through a pressure signal in the signal line 18 or 18*a*, are designed so that the working range of the multiway valve 15*b* is above the working range of the multiway valve 15*a*. For example, the multiway valve 15*a* operates in the control pressure range of 6–8 bar, i.e., the multiway valve 15*a* is fully open at 6 bar of control and is fully closed at 8 bar of control pressure.

On the other hand, the multiway valve 15*b* operates in the control pressure range of 8–10 bar. The control pressure carried in the signal line 18 or 18*a* is analogous to the lowest control pressure serving as the pressure medium source, which is present at the input 23*b* or 24*b*.

The mode of operation of the coupling device is as follows: In the output position, the multiway valves 15*a* and 15*b* are fully open and thus the partial systems I and II are coupled to a single-circuit system. Now if there is a variable pressure signal at the input 23*b*, the valve 22*b* is switched to passage, but because the valve 22*c* is not controlled, there is no control pressure in the line 21*a*, i.e., at the input of the not-and-element. Now if a consumer of the partial system II is controlled, there is also a pressure at the input 24*b*. The two valves thus pass the lowest of these pressures on to the multiway valve 19*b*, which serves as the not-and-element and thus to the multiway valves 15*a* and 15*b* of the coupling unit III. In the control pressure range of 6–8 bar, the valve 15*a* is continuously switched to "separation" against the force of the spring as a function of the control pressure. The load-sensing lines 7 and 13 are first still connected to each other. The pumps thus still deliver with the same pressure. At the multiway valve 15*b*, the highest load-sensing pressure acts in the closing direction on the control surface 29, which is as large as the control surfaces 27 and 28 put together. In the opening direction, the load-sensing pressure of partial system I acts on the control surface 27 and the load-sensing pressure of partial system II on the control surface 28. Because the load-sensing pressures in both partial systems are still identical, an equilibrium prevails at the multiway valve 15*b*, which thus remains open.

If the input pressure that is passed on to the not-and-element increases further, i.e., above 8 bar, the equilibrium at the multiway valve 15*b* is changed and it is continuously shifted in the closing direction, by which the load-sensing lines 7 and 13 are separated from each other. Each adjusting or variable displacement pump 1 and 9 can now deliver with its own pressure level and its own delivery stream, depending on the load conditions. Different load-sensing pressures and different delivery streams thus set in the two separated partial systems I and II; this does not occur suddenly, but is controlled by influencing the control pressure-producing consumer actuation elements (which are usually designed as hand lever control devices).

The controlled separation of the two partial systems also functions in the reverse direction, i.e., during coupling to a single-circuit system. If the excavator is to be operated parallel to the actuation of consumers that effect a separation of the two partial systems and a variable signal is thus present at the input 20*b* of the multiway valve 19*b* acting as a not-and-element, the latter is continuously shifted into a position as a function of the signal intensity in which the control pressure in the signal line 18 and the line 18*a* is reduced. Due to the fact that the highest load-sensing pressure of the two partial systems I and II is present at the multiway valve 15b acting in the opening direction, the latter is first shifted in the opening direction and thus the load-sensing lines 7 and 13 of the partial systems are connected with each other, in which case the load-sensing pressure of the partial system with the lower load is modified in a control pressure-dependent manner and a synchronization of the pump pressures thus occurs. The delivery amounts and thus the movement speeds thus do not change in a jerky manner. With a further dropping control pressure, the coupling of the two partial systems finally takes place.

While certain presently preferred embodiments of the present invention have been described and illustrated, it is to be distinctly understood that the invention is not limited thereto but may be otherwise embodied and practiced within the scope of the following claims.

I claim:

1. Hydraulic drive system of the load-sensing type comprising:

first partial system and a second partial system, where the partial systems each comprises a pump, hydraulic power consumers each having specific operating requirements connected to its delivery lines, and a load pressure line carrying the highest load pressure;

a coupling device for joining the delivery line and the load pressure line of the first partial system with the delivery line and the load pressure line of the second partial system; and control means for activating said coupling device as a function of the operating requirements of specific consumers, said control means including a circuit logic (IV) that supervises whether said first partial system, said second partial system or both will drive a specific consumer, wherein when the consumers are not actuated the partial systems (I, II) are connected together by the coupling device (III) and the circuit logic (IV) has a not-and-element (19) whose first input (20) is connected with a signal transmitter of at least one consumer, whose power supply is provided through the coupled partial systems (I, II) and whose second input (21) is connected with the output of an and-element (22), to the inputs (23, 24) of which signal transmitters of the consumers of both partial systems (I, II) are connected, the supplying of which with hydraulic power with simultaneous actuation is provided by the proper partial system (I, II), in which case a signal transmitter of at least one consumer of the first partial system (I) is connected to the one input (23) of the and-element (22) and a signal transmitter of at least one consumer of the second partial system (II) is connected to the other input (24).

2. Hydraulic drive system of the load-sensing type comprising:

first partial system and a second partial system, where the partial systems each comprises a pump, hydraulic power consumers each having specific operating requirements connected to its delivery lines, and a load pressure line carrying the highest load pressure;

a coupling device for joining the delivery line and the load pressure line of the first partial system with the delivery line and the load pressure line of the second partial system; and control means for activating said coupling device as a function of the operating requirements of specific consumers, said control means including a circuit logic (IV) that supervises whether said first partial system, said second partial system or both will drive a specific consumer.

wherein said coupling device further comprises a multiway valve (15) switched between the delivery lines (2, 10) and the load pressure lines (7, 13) of the partial systems (I, II) and having an opening and a closing position, and which is spring-loaded in the opening direction and can be acted upon in the closing direction by an output signal of the circuit logic (IV) carried in a signal line (18), and wherein the output signal consists of a hydraulic pressure signal and the circuit logic (IV) is comprised of hydraulic valves (19a, 22a), of which a first multiway valve (19a) is connected to the signal line (18); spring-loaded in the output state it connects the signal line (18) with the output of a superposed second multiway valve (22a) and in the actuated state it connects the signal line (18) to a drain line (25), in which case the second multiway valve (22a), spring-loaded in the output state, connects the signal line (18) to a drain line (26) and in the actuated state connects the signal line (18) with a line (23a), in which there is a pressure as a function of the controlling of at least one of the consumers pertaining to one of the partial systems (I, II).

3. Hydraulic drive system according to claim 2, wherein the valves (19a, 22a) an be controlled hydraulically.

4. Hydraulic drive system according to claim 1, wherein the coupling device (III) further comprises a first multiway valve (15a) inserted between the delivery lines (2, 10) of the partial systems (I, II) and a second multiway valve (15b) inserted between the load pressure lines (7, 13) of the partial systems (I, II), where the multiway valves (15a, 15b) which have an opening and closing position and throttle in the intermediate positions can be acted upon in the closing direction by a parallel hydraulic pressure signal and where the working range of the second multiway valve (15b) is above the working range of the first multiway valve (15a).

5. Hydraulic drive system according to claim 1, wherein that the coupling device (III) further comprises a multiway valve (15) switched between the delivery lines (2, 10) and the load pressure lines (7, 13) of the partial systems (I, II) and having an opening and a closing position, and which is spring-loaded in the opening direction and can be acted upon in the closing direction by an output signal of the circuit logic (IV) carried in a signal line (18).

* * * * *

UNITED STATES PATENT AND TRADEMARK OFFICE

CERTIFICATE OF CORRECTION

PATENT NO. : 5,211,014

DATED : May 18, 1993

INVENTOR(S) : Walter Kropp

It is certified that error appears in the above-identified patent and that said Letters Patent is hereby corrected as shown below:

Column 1, line 68, after "actuated" insert --.--.

Column 6, line 10, after "control" insert --pressure--.

Signed and Sealed this

Nineteenth Day of April, 1994

Attest:

BRUCE LEHMAN

Attesting Officer

Commissioner of Patents and Trademarks